United States Patent
Rahim et al.

(10) Patent No.: US 8,984,469 B2
(45) Date of Patent: *Mar. 17, 2015

(54) SYSTEM AND METHOD FOR STRENGTHENING OF A CIRCUIT ELEMENT TO REDUCE AN INTEGRATED CIRCUIT'S POWER CONSUMPTION

(71) Applicant: Atrenta, Inc., San Jose, CA (US)

(72) Inventors: Solaiman Rahim, San Jose, CA (US); Mohammad H. Movahed-Ezazi, Saratoga, CA (US); Siddharth Guha, New Delhi (IN); Vaibhav Jain, Noida (IN)

(73) Assignee: Atrenta, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/106,374

(22) Filed: Dec. 13, 2013

(65) Prior Publication Data

US 2014/0282347 A1    Sep. 18, 2014

Related U.S. Application Data

(63) Continuation of application No. 13/828,709, filed on Mar. 14, 2013, now Pat. No. 8,635,578.

(51) Int. Cl.
*G06F 9/455* (2006.01)
*G06F 17/50* (2006.01)

(52) U.S. Cl.
CPC .............. *G06F 17/50* (2013.01); *G06F 17/505* (2013.01); *G06F 2217/78* (2013.01)
USPC ............................ 716/133; 716/132; 716/134

(58) Field of Classification Search
CPC ............ G06F 1/32; G06F 1/10; G06F 1/324; G06F 1/3296; G06F 1/04; G06F 1/3203; G06F 1/3234; G06F 1/3246; G06F 1/3275; G06F 17/50
USPC ................................. 716/106–115, 132–135
See application file for complete search history.

(56) References Cited

U.S. PATENT DOCUMENTS

| | | | |
|---|---|---|---|
| 5,365,182 | A | 11/1994 | King |
| 6,552,752 | B1 | 4/2003 | Tsuji et al. |
| 7,761,827 | B1 * | 7/2010 | Ramachandran et al. ..... 716/108 |
| 7,839,165 | B2 * | 11/2010 | Hutton et al. ................... 326/38 |
| 7,882,461 | B2 | 2/2011 | Jiang et al. |

(Continued)

OTHER PUBLICATIONS

"A New Paradigm for Synthesis and Propagation of Clock Gating Conditions", by Ranan Fraer, Gila Kamhi, Muhammad K. Mhameed, DAC 2008.*

*Primary Examiner* — Nha Nguyen

(74) *Attorney, Agent, or Firm* — Thomas Schneck; Mark Protsik

(57) ABSTRACT

A system and method enable strengthening of flip-Flops (FFs) in an integrated circuit (IC) for the purpose of reducing power consumption. This is achieved by using stability condition (STC) and observability don't-care (ODC) techniques. Strengthening enable is defined as ensuring that a FF later in the fan-out is enabled only when a FF earlier in the fan-out is driving a signal to that later FF. In an embodiment the fan-in of a FF is traversed and the STC or ODC is determined for the FF. Dependent on the determination a STC controller or an ODC controller is added to control the FF's enable signal. In an embodiment the power savings is checked and a controller is added only if there is a reduction in overall power consumption resulting from the addition of the controller.

14 Claims, 5 Drawing Sheets

(56) References Cited

U.S. PATENT DOCUMENTS

| | | | |
|---|---|---|---|
| 7,930,673 B2 | 4/2011 | Jiang et al. | |
| 7,966,593 B1* | 6/2011 | Ramachandran et al. | 716/109 |
| 8,219,946 B1* | 7/2012 | Manovit et al. | 716/104 |
| 8,285,527 B2* | 10/2012 | Rahim et al. | 703/2 |
| 8,423,935 B1* | 4/2013 | Manovit et al. | 716/107 |
| 8,434,047 B1* | 4/2013 | Jiang et al. | 716/133 |
| 2007/0143726 A1* | 6/2007 | Mizutani et al. | 716/11 |
| 2007/0214437 A1* | 9/2007 | Kajihara | 716/1 |
| 2008/0301594 A1* | 12/2008 | Jiang et al. | 716/2 |
| 2009/0064070 A1* | 3/2009 | Kitahara et al. | 716/6 |
| 2009/0189662 A1* | 7/2009 | Uchida | 327/199 |
| 2009/0256609 A1* | 10/2009 | Naffziger | 327/203 |
| 2010/0026340 A1* | 2/2010 | Hutton et al. | 326/39 |
| 2011/0010684 A1* | 1/2011 | Sato et al. | 716/138 |
| 2011/0288825 A1* | 11/2011 | Rahim et al. | 703/1 |
| 2013/0305199 A1* | 11/2013 | He et al. | 716/104 |

* cited by examiner

SYSTEM AND METHOD FOR STRENGTHENING OF A CIRCUIT ELEMENT TO REDUCE AN INTEGRATED CIRCUIT'S POWER CONSUMPTION

CROSS-REFERENCE TO RELATED APPLICATION

This patent application is a continuation of U.S. patent application Ser. No. 13/828,709, filed Mar. 14, 2013, now U.S. Pat. No. 8,635,578, granted Jan. 21, 2014.

TECHNICAL FIELD

The present invention relates to integrated circuit design, and more particularly to a system, a method and a computer program product that can enable strengthening of a circuit element in a circuit design for reduction of power consumption by the integrated circuit.

BACKGROUND ART

Power consumption is a major consideration in integrated circuit (IC) design. In the case of a flip-flop (FF), more power is consumed when the FF is in an enabled state. Since FFs need to transfer data from one to the other it is desirable that a second FF be enabled only when a first FF is configured to transfer data.

It would therefore be advantageous to provide a solution ensuring that a FF is enabled only when data is being transferred to it. It would be further beneficial if such solution be further scalable to large circuit designs.

SUMMARY DISCLOSURE

A method implemented in a programmable system provides for power reduction of an integrated circuit design. The method is performed by a data processing system (e.g., a programmable general-purpose computer system or a computer-aided design (CAD) system) that contains a processing unit and memory storing the program instructions executed by the processing unit and a description of a design of the integrated circuit. Thus, the method may be embodied in a tangible computer software product containing program instructions that when executed on a computer in conjunction with a received circuit description perform the method.

The method begins by receiving from storage a description of the integrated circuit or some portion thereof. For each flip-flop in the circuit the system determines at least one of a stability condition (STC) and observability don't care condition (ODC). An enable condition of the flip-flop may then be strengthened in an updated circuit design by adding an ODC controller, STC controller, or both. The ODC controller generates an enable signal to the flip-flop if an ODC check has not passed, and otherwise generates an enable signal that is an AND function of an original enable signal and of an ODC at the immediately previous clocked time unit. The STC controller generates an enable signal to the flip-flop if an STC check has not passed, and otherwise generates an enable signal that is an AND function of the original enable signal and of an STC at an immediately subsequent clocked time unit. After performing computations to compare power consumption of the updated circuit design with that of the existing design, the updated design is stored if power savings exceed a predetermined threshold, but otherwise discarded.

DETAILED DESCRIPTION

The system, such as a computer-aided design (CAD) system, is configured to enable strengthening of flip-plops (FFs) in the design of an integrated circuit (IC) for the purpose of reducing power consumption. This is achieved by using stability condition (STC) and observability don't-care (ODC) techniques. Strengthening the enable is defined as ensuring that a FF later in the fan-out is enabled only when a FF earlier in the fan-out is driving a signal to that later FF. In an embodiment the fan-in of a FF is traversed and the STC or ODC is determined for the FF. Dependent on the determination a STC controller or an ODC controller is added to control the FF's enable signal. In an embodiment the power savings is checked and a controller is added only if there is a reduction in overall power consumption resulting from the addition of the controller.

Figure 1A:
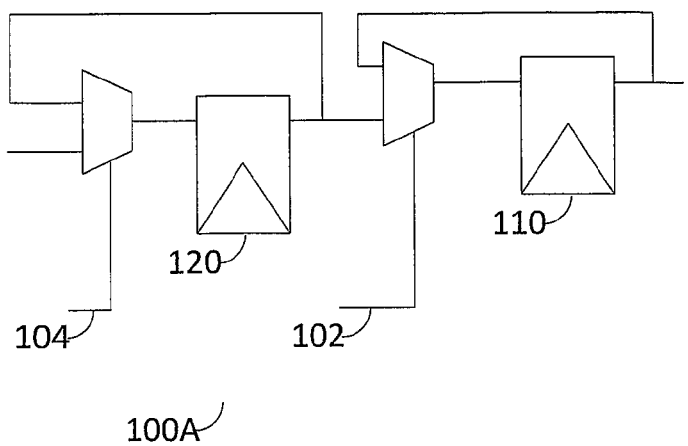
FIG. 1A is a circuit diagram of a first circuit lacking enable strengthening for FFs.

FIG. 1A depicts an exemplary and non-limiting circuit diagram 100A lacking enable strengthening of the FFs. It can been seen that it is not possible to simply strengthen the second enable 102 (En2) of the second FF 110 by defining a new enable as the second enable 102 AND the first enable 104 (En1) at time T plus one cycle, i.e., the Boolean expression En2 & En1(T+1). Supposing the first enable 104 is 1 at time T=0 and then 0 for the rest of the time, a new value is written in the first FF 120 at time T=0 and this value of the first FF 120 does not change. If, additionally, the second enable 102 is 0 at time T=1 and then 1 the rest of the time, the value written in the first FF 120 will be written in the first FF 120 at time T=2. However if the second enable 102 of the second FF 110 is changed so the new enable is En2 & En1(T+1), then this enable is always 0 and hence no value is written in the second FF 110.

Figure 1B:
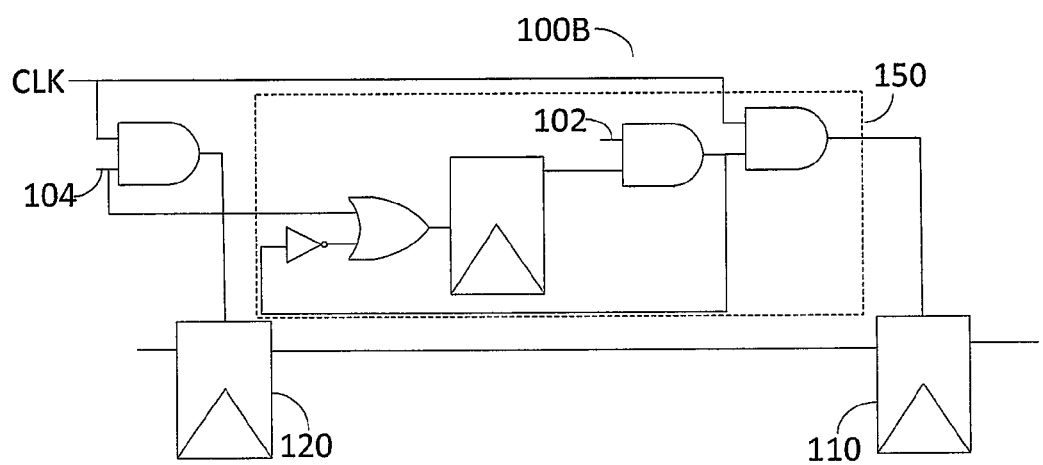
FIG. 1B is a circuit diagram of the first circuit further enhanced with enable strengthening of the FFs according to an embodiment.
Figure 1C:
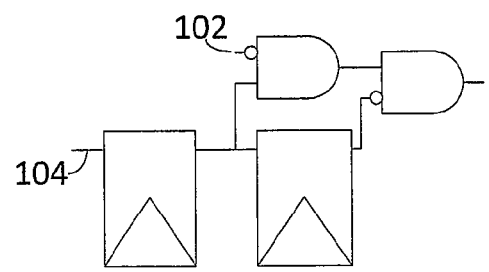
FIG. 1C is an assertion for checking a stuck to '0' situation for use with the flowchart of FIG. 4.

Therefore, according to an embodiment of the invention, an approach that overcomes the problem is suggested, and shown in FIG. 1B, which is an exemplary and non-limiting circuit diagram 100B with enable strengthening of the FF 110. This is done by using STC as explained herein below. According to an embodiment, a controller sub-circuit 150 is used to strengthen the second enable 102 of the second FF 110. The controller 150 ensures that when a value is written on the first FF 120, this value is then written to the second FF 110 at the first cycle when the second enable 102 has a value of 1. If the value written in the first FF 120 is overwritten before the second enable 102 turns to 1, then the controller 150 only writes the last value stored in the first FF 120 into the second FF 110, which conforms to the circuit's desired functionality. The controller 150 saves power, since each time the second enable 102 is 1 after the first one will be shutdown given the fact that no value has been written on the first FF 120 therein between. According to a further embodiment, an analysis takes place to ensure that the addition of the controller 150 does not offset the power savings reached for the circuit 100A that lacks the controller 150. In one embodiment the STC controller 150 is added only if it is determined that the STC property check does not successfully pass.

Figure 2A:
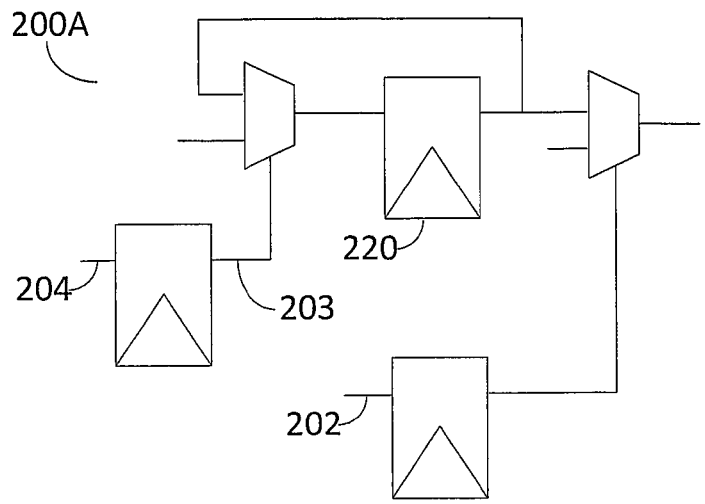
FIG. 2A is a second circuit diagram lacking enable strengthening for FFs.

Reference is now made to FIG. 2A, that depicts an exemplary and non-limiting circuit diagram 200A without enable strengthening. The ODC of the first FF 220 is the second enable 202 (En2). Strengthening the first enable 204 (En1) of the firt FF 220, by using the second enable 202 at time T−1 is erroneous. Indeed if a transition of the first enable 204 occurs from 1 to 0 and a transition of the second enable 202 occurs from 0 to 1, then the enable En1 & En2(T−1) will be equal to 0 and the value that should have been written to the first FF 220 will not be written and will be lost, which is undesirable result. In order to solve this problem, it is useful to detect any transition from 1 to 0 on the first enable 204. If such a transition occurs then the first enable 204 should not be shut down even if the second enable 202 at time T−1 is 0.

Figure 2B:
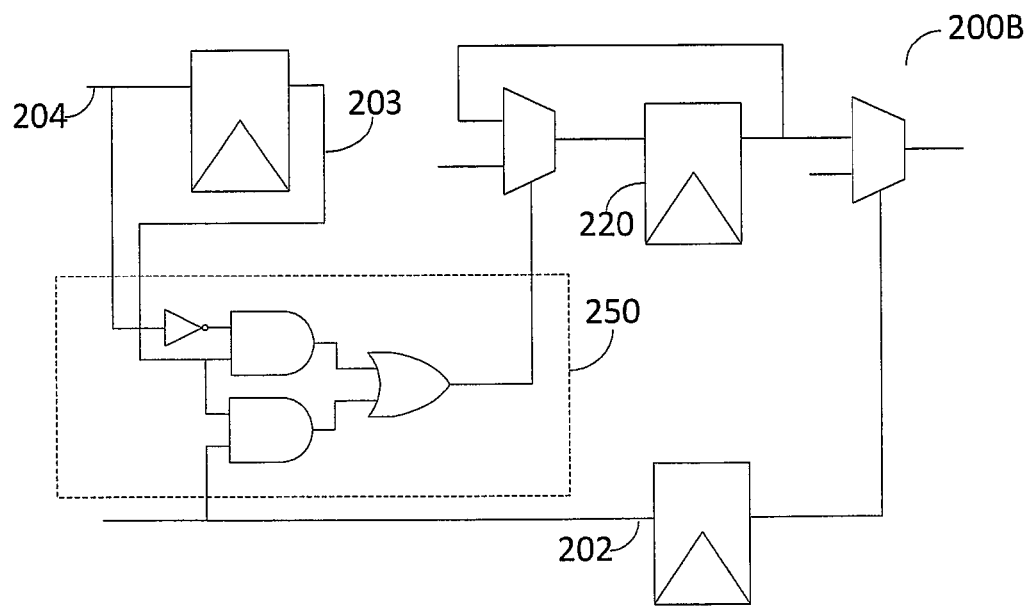
FIG. 2B is a circuit diagram of the second circuit further enhanced with enable strengthening of the FFs according to an embodiment.

Therefore, in order to overcome the deficiencies of circuit 200A, and according to an embodiment of the invention, the approach suggested in FIG. 2B is provided. FIG. 2B presents an exemplary non-limiting circuit diagram 200B with enable strengthening of the FFs. An ODC controller sub-circuit 250 is configured to save power. When the second enable 202 at time T−1 is 0 and the first enable 204 at time T is 1 and enable at time T−1 is 1, then the new enable of the first FF 220 is set to be at 0 instead of being 1, therefore saving on power. Utilization of the ODC controller 250 is possible only if enable at time T−1 exists. This is needed in order to detect any transition from 1 to 0. If the first enable 204 is a primary input (PI), then this controller cannot be realized. The ODC controller 250 should be fine-tuned depending on if the Enable to strengthen is positive high or negative high, same as for the ODC. For example if the first FF 220 is non-observable when ODC is 1, then one should not AND the En2(T−1) and En1 but rather create En1 & !En2(T−1). Regardless, according to an embodiment, an ODC controller is provided to control power consumption of the circuit. In one embodiment the ODC controller 250 is added only if it is determined that the ODC property check does not successfully pass.

Figure 2C:
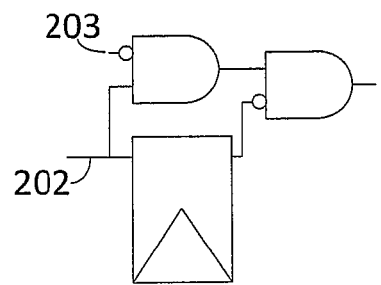
FIG. 2C is an assertion for checking a stuck to '0' situation for use with the flowchart of FIG. 3.
Figure 3:
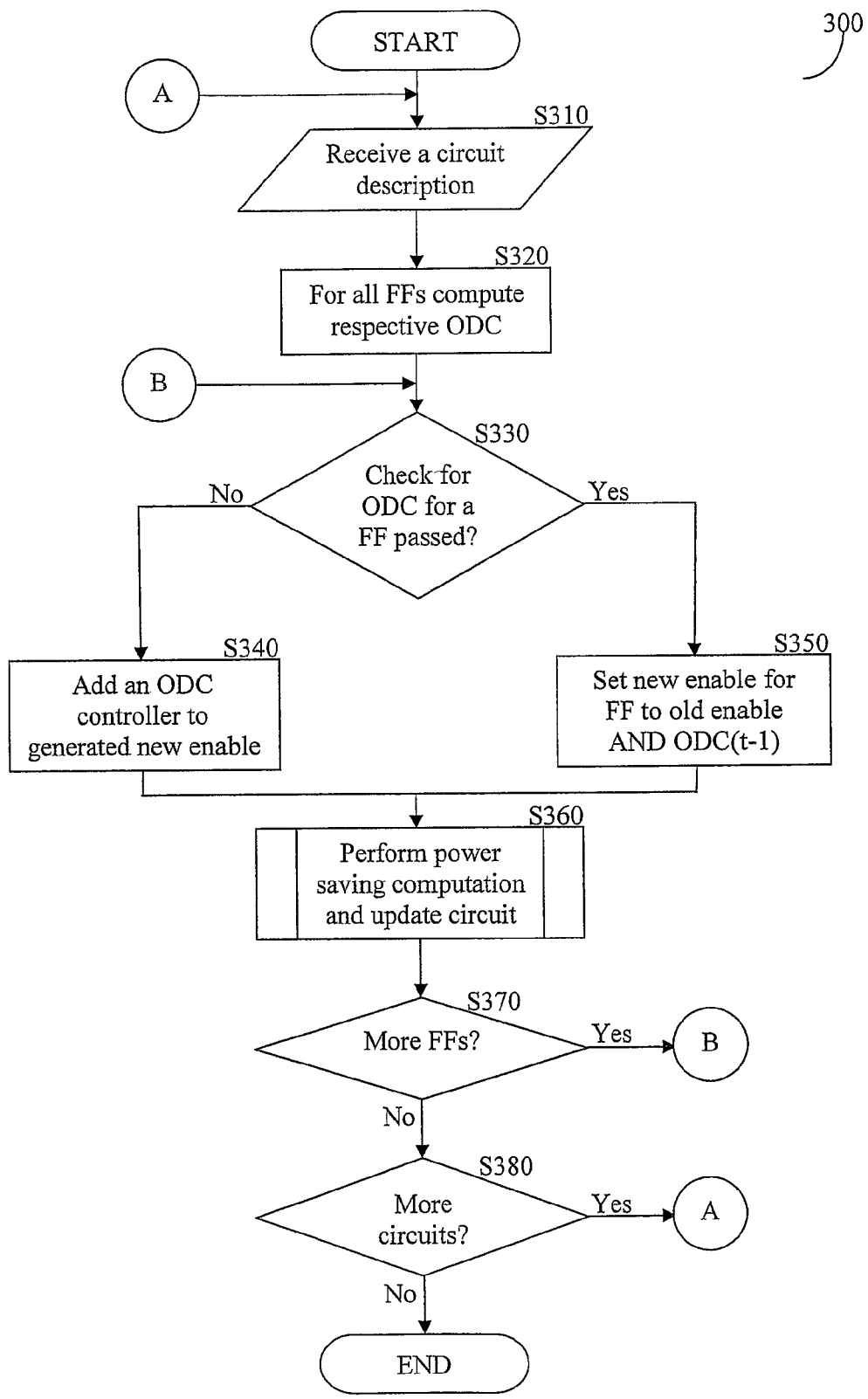
FIG. 3 is a flowchart for configuring enable strengthening of a circuit by adding an ODC controller according to an embodiment.

FIG. 3 is an exemplary and non-limiting flowchart 300 for configuring enable strengthening of a circuit by adding an ODC controller according to an embodiment. In S310 a circuit description is received. In S320 for all FFs in the circuit their respective ODC is computed. In optional S330 it is checked whether ODC for a FF has passed and if so execution continues with S350; otherwise, execution continues with S340. To perform this check the assertion shown in FIG. 2C is constructed and using a formal engine it is checked if it is stuck to '0', and if 'yes' it means that S330 passes. In S340 an ODC controller is added, as described hereinabove, to provide a new enable signal to the FF. In optional S350 the FF's new enable is set to a value equal to the old enable signal AND the ODC value at time t−1. It should be noted that if optional S330 and S350 are not present, the flow continues from S320 to S340 and continues with optional S360, if present, or with S370. In optional S360 the power saving is computed and if power saving is not achieved the changes to the FF enable signal are not inserted into the circuit description, otherwise, i.e., it there are power savings, the change in the circuit remains and support the power reduction. Power savings may be determined as any value above a predetermined threshold. In S370 it is checked whether there are more FFs to be handled, and if so execution continues with optional S330; otherwise, execution continues with S380. In S380 it is checked whether additional circuits are to be handled and if so, execution continues with S310; otherwise, execution terminates.

Figure 4:
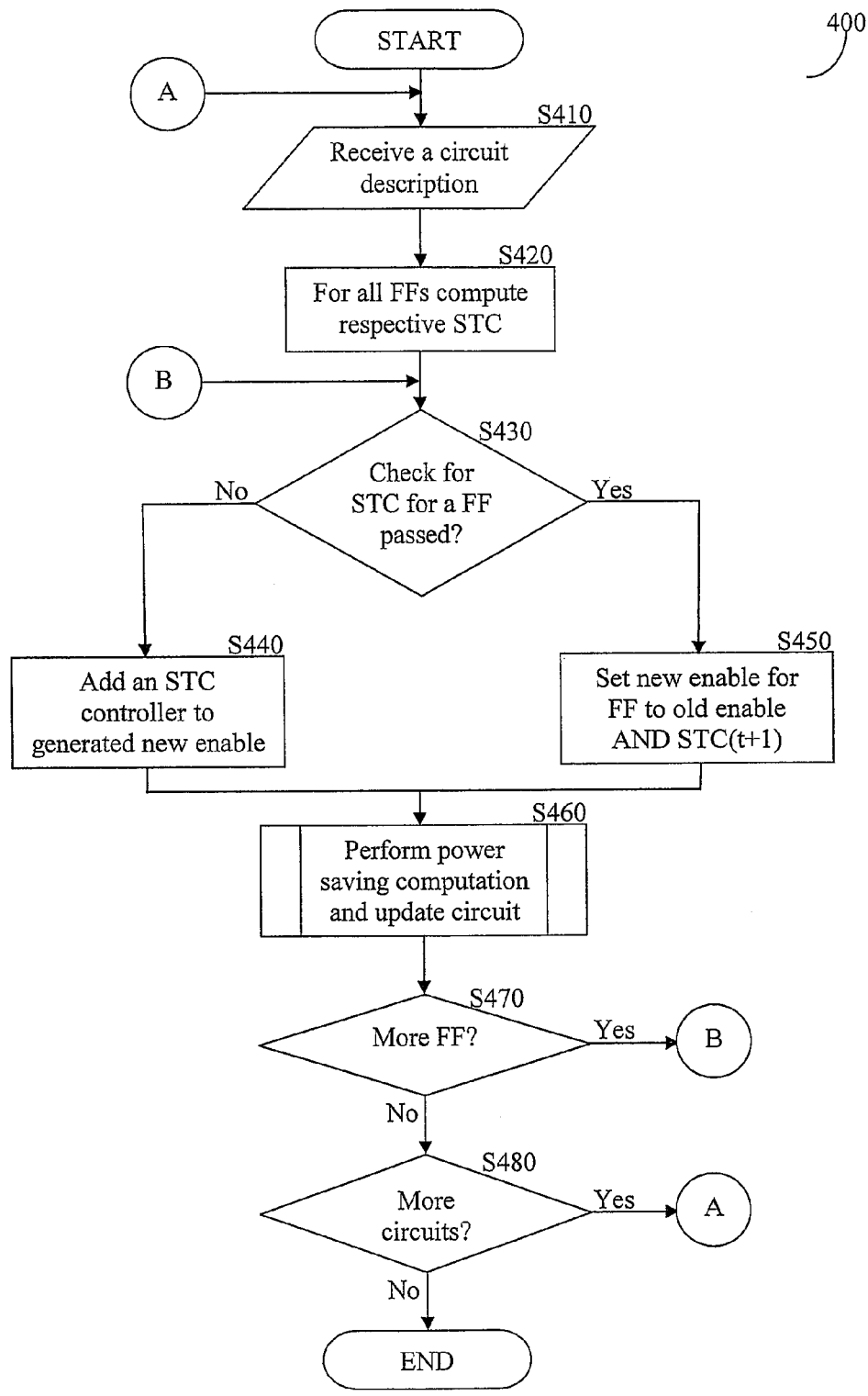
FIG. 4 is a flowchart for configuring enable strengthening of a circuit by adding an STC controller according to an embodiment.

Reference is now made to FIG. 4 that depicts and exemplary and non-limiting flowchart 400 for configuring enable strengthening of a circuit by adding an STC controller according to an embodiment. In S410 a circuit description is received. In S420 for all FFs in the circuit their respective STC is computed. In optional S430 it is checked whether STC for a FF has passed and if so execution continues with S450; otherwise, execution continues with S440. To perform this check the assertion shown in FIG. 10 is constructed and using a formal engine it is checked if it is stuck to '0', and if 'yes' it means that S430 passes. In S440 an STC controller is added, as described hereinabove, to provide a new enable signal to the FF. In optional S450 the FF's new enable is set to a value equal to the old enable signal AND the STC value at time t+1. It should be noted that if optional S430 and S450 are not present, the flow continues from S420 to S440 and continues with optional S460, if present, or with S470. In optional 4360 the power saving is computed and if power saving is not achieved the changes to the FF enable signal are not inserted into the circuit description, otherwise, i.e., it there are power savings, the change in the circuit remains and support the power reduction. Power savings may be determined as any value above a predetermined threshold. In S470 it is checked whether there are more EFs to be handled, and if so execution continues with optional S430; otherwise, execution continues with S480. In S480 it is checked whether additional circuits are to be handled and if so, execution continues with S410; otherwise, execution terminates.

Figure 5:
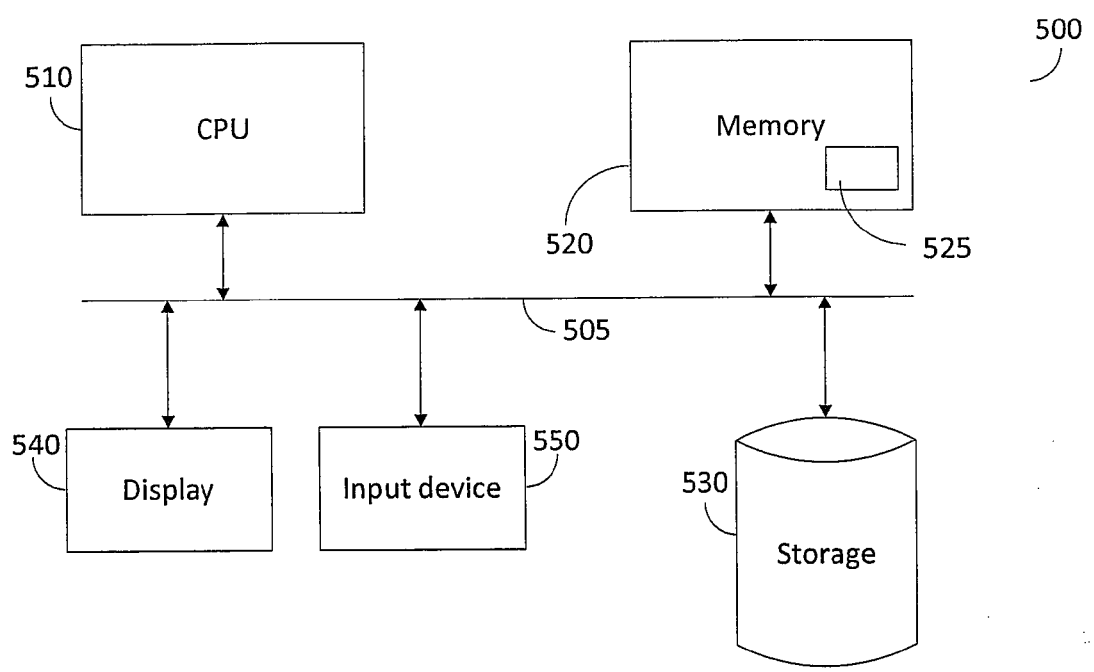
FIG. 5 is a system for IC design that provide enable strengthening to at least a portion of an IC according to an embodiment.

FIG. 5 shows an exemplary and non-limiting system 500, such as a computer aided design (CAD) system, implemented according to the principles of the invention disclosed herein. The system 500 comprises a processing unit 510, for example, one or more central processing units (CPUs), coupled via a bus 505 to a memory 520 The memory 520 further comprises a memory portion 525 used for containing instructions that when executed by the processing unit 510 perform at least the methods disclosed herein. The processing unit 510 may be coupled to a display unit 540, e.g., a computer screen, an input device 550, e.g., a mouse and/or a keyboard, and a data storage 530. Data storage 530 may be used for the purpose of holding the circuit description upon which the methods described hereinabove are performed and into which the updated circuit, made in accordance with an embodiment, are stored therein.

The principles of the invention are implemented as hardware, firmware, software or any combination thereof, including but not limited to a CAD system and software products thereof. Moreover; the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit and/or display unit.

What is claimed is:

1. A method implemented in a programmable system for incorporating in a design description of an integrated circuit a power reduction circuit for a flip-flop (FF) having an enable condition for a clock signal of the FF, the method comprising:
adding to the design description at least one of: an observability don't care condition (ODC) controller to strengthen an enable condition of the FF of the design description based on respective ODC of the FF, the ODC controller configured to generate an enable signal to the FF; and, a stability condition (STC) controller to strengthen an enable condition of the FF based on respective STC of the FF and causing the STC controller to generate an enable signal to the FF;
performing power saving computations to compare power consumption of the integrated circuit both with and without each added controller;
discarding any additional controller from the updated design description whenever power consumption saving achieved is below a predetermined threshold; and
storing in a memory of the programmable system an updated description of the integrated circuit;
wherein strengthening the enable condition of the FF ensures that a subsequent FF in a fan-out of the FF is enabled only when the FF drives a signal to the subsequent FF.

2. The method of claim 1, further comprising:
determining for the FF at least one of: an STC and an ODC.

3. The method of claim 1, wherein the ODC controller added to the design description generates the FF enable signal that is an AND function of an original enable signal to the FF and an ODC at an immediately previous time unit.

4. The method of claim 1, wherein the STC controller added to the design description generates the FF enable signal that is an AND function of an original enable signal to the FF and an STC at an immediately subsequent time unit.

5. The method of claim 1, wherein the programmable system is selected from any of a computer system, a processing unit, or a computer-aided design (CAD) system.

6. A tangible computer software product embodied on a non-transitory computer storage medium having stored thereon program instructions that cause the method of claim 1 to be performed whenever the instructions are executed by a programmable system.

7. A method implemented in a programmable system for incorporating in a design description of an integrated circuit an observability don't care condition (ODC) controller, the method comprising:
identifying a flip-flop (FF) in the design description having an enable condition of a clock signal of the FF;
determining for the FF an ODC;
adding to the design description the ODC controller, wherein the ODC controller is configured to generate an enable signal to the FF that is an AND function of an original enable signal to the FF and an ODC at an immediately previous time unit;
performing power saving computations to compare power consumption of the integrated circuit both with and without the ODC controller;
discarding the ODC controller from the updated design description whenever power consumption saving achieved is below a predetermined threshold; and
storing in a memory of the programmable system an updated description of the integrated circuit.

8. The method of claim 7, wherein an enable condition of the enable signal of the FF is strengthened by ensuring that a subsequent FF in a fan-out of the FF is enabled only when the FF drives a signal to the subsequent FF.

9. The method of claim 7, wherein the programmable system is selected from any of a computer system, a processing unit, or a computer-aided design (CAD) system.

10. A tangible computer software product embodied on a non-transitory computer storage medium having stored thereon program instructions that cause the method of claim 7 to be performed whenever the instructions are executed by a programmable system.

11. A method implemented in a programmable system for incorporating in a design description of an integrated circuit a stability condition (STC) controller, the method comprising:
identifying a flip-flop (FF) in the design description having an enable condition of a clock signal of the FF;
determining for the FF a STC;
adding to the design description the STC controller, wherein the STC controller is configured to generate an enable signal to the FF that is an AND function of an original enable signal to the FF and an STC at an immediately subsequent time unit;
performing power saving computations to compare power consumption of the integrated circuit both with and without the STC controller;
discarding the STC controller from the updated design description whenever power consumption saving achieved is below a predetermined threshold; and
storing in a memory of the programmable system an updated description of the integrated circuit.

12. The method of claim 11, wherein an enable condition of the enable signal of the FF is strengthened by ensuring that a subsequent FF in a fan-out of the FF is enabled only when the FF drives a signal to the subsequent FF.

13. The method of claim 11, wherein the programmable system is selected from any of a computer system, a processing unit, or a computer-aided design (CAD) system.

14. A tangible computer software product embodied on a non-transitory computer storage medium having stored thereon program instructions that cause the method of claim 11 to be performed whenever the instructions are executed by a programmable system.

* * * * *